US009701359B2

(12) United States Patent
Cervino (10) Patent No.: US 9,701,359 B2
(45) Date of Patent: Jul. 11, 2017

(54) SCOOTER VEHICLE WITH INTEGRATED PILLION TRANSPORT CONTAINER (71) Applicant: Skoot Logistics Australia Pty Limited, Edgecliff, New South Wales (AU)

(72) Inventor: Carl Cervino, New South Wales (AU)

(73) Assignee: Skoot Logistics Australia Pty Limited, Edgecliff, New South Wales (AU)

( * ) Notice: Subject to any disclaimer, the term of this patent is extended or adjusted under 35 U.S.C. 154(b) by 0 days.

(21) Appl. No.: 14/890,476

(22) PCT Filed: Jul. 8, 2013

(86) PCT No.: PCT/AU2013/000748
§ 371 (c)(1),
(2) Date: Nov. 11, 2015

(87) PCT Pub. No.: WO2014/005198
PCT Pub. Date: Jan. 9, 2014

(65) Prior Publication Data
US 2016/0152295 A1    Jun. 2, 2016

(30) Foreign Application Priority Data

Jul. 6, 2012 (AU) ................................ 2012902911

(51) Int. Cl.
*B62K 19/46* (2006.01)
*G09F 13/04* (2006.01)
(Continued)

(52) U.S. Cl.
CPC .................. *B62K 19/46* (2013.01); *B62J 6/00* (2013.01); *B62J 9/001* (2013.01); *B62K 11/02* (2013.01); *G09F 13/04* (2013.01); *G09F 21/048* (2013.01)

(58) Field of Classification Search
CPC .............. B62J 6/00; B62J 9/001; B62K 19/46
See application file for complete search history.

(56) References Cited

U.S. PATENT DOCUMENTS

| 4,163,513 A | 8/1979 | Kramer |
| 6,971,438 B2* | 12/2005 | Oki .......................... F01P 3/18 |
| | | 123/196 AB |
| 2014/0042200 A1* | 2/2014 | Namani ................... H05K 7/00 |
| | | 224/413 |

FOREIGN PATENT DOCUMENTS

| AU | 2004100929 A4 | 12/2004 |
| BR | 9703216 A | 12/1998 |

(Continued)

OTHER PUBLICATIONS

Australian Patent Office, International Search Report and Written Opinion, Oct. 8, 2013, 9 pages, Australia.

(Continued)

*Primary Examiner* — Kevin Hurley
(74) *Attorney, Agent, or Firm* — Nixon Peabody LLP (57) ABSTRACT A scooter vehicle with integrated pillion transport container the scooter vehicle including at least two wheels, one driven wheel and one steering wheel, a set of handlebars for steering the steering wheel to direct a scooter vehicle, a seat for a user, a step through frame, a platform for users feet, bodywork panels fitted to the frame and a power plant associated with at least one alternator in order to generate electrical current, and the integrated pillion transport container including a generally U-shaped lower portion to be attached to the scooter frame, the container having an enclosure defined by number of walls and having an interior portion adapted for receiving articles to be transported, at least one of the walls being a forward wall shaped to act as a back support for a user, and an illumination source located in the container for illuminating at least part of at least one external wall of the container, at least some of the walls to allow at least some of the illumination to pass therethrough.

15 Claims, 4 Drawing Sheets

(51) Int. Cl.
*B62J 9/00* (2006.01)
*G09F 21/04* (2006.01)
*B62J 6/00* (2006.01)
*B62K 11/02* (2006.01)

(56) References Cited

FOREIGN PATENT DOCUMENTS

| | | | | |
|---|---|---|---|---|
| CN | 2853566 Y | | 1/2007 | |
| EP | 0 807 568 A2 | | 11/1997 | |
| GB | 2477992 A | * | 8/2011 | ................ B62J 6/00 |
| JP | 02303982 A | | 12/1990 | |
| KR | 100838949 B1 | | 6/2008 | |

OTHER PUBLICATIONS

The International Bureau of WIPO, International Preliminary Report on Patentability, Jan. 6, 2015, 6 pages, Geneva, Switzerland.

* cited by examiner

SCOOTER VEHICLE WITH INTEGRATED PILLION TRANSPORT CONTAINER

CROSS-REFERENCE TO RELATED APPLICATIONS

The present application is a 371 National Phase filing of International Application No. PCT/AU2013/000748 filed Jul. 8, 2013, which claims priority to and the benefit of Australian Patent Application No. 2012902911 filed Jul. 6, 2012.

TECHNICAL FIELD

The present invention relates to goods transport and particularly for economical and easy transport of perishable food items such as in a home delivery food service.

BACKGROUND ART

Scooters with transport containers at the pillion, are known.

For example, known methods of food delivery conventionally include the use of an insulated container which can be strapped to a rear portion of the motorcycle or scooter. These containers are typically a phone, insulated bag in which to transport pizzas in pizza boxes from kitchen to a home consumer. These bags typically serve the purpose of transporting the pizza and attempting to maintain the pizzas heat.

It is also known to have an illuminated container to transport items attached or mounted at the pillion of a scooter. These illuminated containers are normally connected to the scooter's electrical power source.

An electrical power source of 150 cc scooter consists of an alternator, rectifier, battery, cables and switchers. The rectifier converts alternating current (AC) generated by alternator into direct current (DC) in order to supply electrical power for the following devices of a scooter:

Lamps (front lamp, rear lamp, direction lamp and hazard lamp)
speedometer
ignition
battery The alternator and rectifier are key elements of electrical power supply for a scooter. The value of output current and voltage from the alternator depends on cutting speed of magnet flux by stator coils. The speed range of the motor scooter can vary between 1500 r/m to 7500 r/m. Therefore, the electrical power generated changed from time to time.

The battery plays an important role in the electrical power system. It becomes a buffer to store extra power when voltage from the rectifier is higher. It discharges when voltage is lower. Most of the time the motorbike does not require a strong electrical power from the alternator as it contributes more heat onto the rectifier. These facts contribute a varied voltage value on the electrical power system of a motor scooter especially at the times when the motor scooter starts and when it is running at low speed.

The provision of an illuminated container or container with illuminated display means at the rear of a motor scooter introduces an innovative outdoor mobile media particularly for food or drink delivery. When an illuminated display means is introduced, it not only requires an extra electrical power but also a stable voltage supply system to ensure that the illuminated display means works well and consistently.

The illuminated display means will typically increase the load on the power supply system in excess of that which the conventional scooter power supply means is capable of creating.

It will be clearly understood that, if a prior art publication is referred to herein, this reference does not constitute an admission that the publication forms part of the common general knowledge in the art in Australia or in any other country.

SUMMARY OF INVENTION

The present invention is directed to a scooter vehicle with integrated pillion transport container, which may at least partially overcome at least one of the abovementioned disadvantages or provide the consumer with a useful or commercial choice.

With the foregoing in view, the present invention in one form, resides broadly in a scooter vehicle with integrated pillion transport container the scooter vehicle including at least two wheels, one driven wheel and one steering wheel, a set of handlebars for steering the steering wheel to direct a scooter vehicle, a seat for a user, a step through frame, a platform for a user's feet, bodywork panels fitted to the frame and a power plant associated with at least one alternator in order to generate electrical current, and the integrated pillion transport container including a generally U-shaped lower portion to be attached to the scooter frame, the container having an enclosure defined by number of walls and having an interior portion adapted for receiving articles to be transported, at least one of the walls being a forward wall shaped to act as a back support for a user, and at least one illumination source located in the container for illuminating at least part of at least one external wall of the container, at least some of the walls to allow at least some of the illumination to pass therethrough.

The present invention in an alternative form, resides in a scooter vehicle with integrated pillion transport container the scooter vehicle including at least two wheels, one driven wheel and one steering wheel, a set of handlebars for steering the steering wheel to direct a scooter vehicle, a seat for a user, a step through frame, a platform for a user's feet, bodywork panels fitted to the frame and a power plant associated with at least one alternator in order to generate electrical current, and the integrated pillion transport container including a generally U-shaped lower portion to be attached to the scooter frame, the container having an enclosure defined by number of walls and having an interior portion adapted for receiving articles to be transported, and at least one illumination source located in the container for illuminating at least part of at least one external wall of the container, at least some of the walls to allow at least some of the illumination to pass therethrough.

The transportable container will typically be adapted for transporting food, the container in the form of a box, typically for attachment to a rear portion of a motorcycle or motor scooter. Use of the term "scooter" herein is intended to include other powered, generally single person vehicles such as motorcycles and motor scooters and the like.

Preferably, at least one external wall of the container is adapted for displaying indicia.

Preferably one of the plurality of walls includes a door which can be opened and closed to allow access to an interior portion of the container.

The container is preferably dimensioned to fit upon the scooter. Preferably, the container dimensions are such that the container is no wider than the width of the handlebars at the widest point of the container and even more preferred is that the container be as wide as possible without extending laterally past the free ends of the handlebars on either side of the scooter.

The container is preferably generally rectangular and an even more preferred shape is generally cubic. The container will typically have a top wall, at least one bottom wall, left and right side walls, a forward wall and rear wall.

The top wall will preferably be substantially planar. Typically, the top wall of the container includes a generally rectangular wall portion which fits together with an upper, rearwardly extending wall portion formed as part of the forward wall and a similarly an upper and inwardly extending wall portion formed as a part of each of the left and right side walls.

The bottom wall will typically be shaped to correspond with at least a portion of the rear of the scooter in the pillion area. The scooter typically has a pillion area provided behind the user's seat designed to correspond with the base wall shape of the preferred container.

The pillion area of the scooter preferably has a raised central rail, oriented coaxially with the longitudinal midline or axis of the scooter. A pair of downwardly depending shoulder portions are preferably provided from the raised central rail and a pair of lateral depressions at a level lower than the raised central rail are preferably provided, one on either side of the central rail. This configuration is preferred although the opposite configuration may be provided.

The base wall of the container is preferably a multipart wall with a number of wall portions at different angles to correspond to the shape provided in the pillion area of scooter. According to the preferred shape, a pair of outer, lateral depressions is provided on the bottom wall which form raised portions on the lower side of the bottom wall, one on either side of a central portion standing proud of the lateral depressions, the central portion on the lower side of the wall forming a depression. Again, this configuration is preferred although the opposite configuration may be provided.

When the container is mounted to the scooter, the outer container depressions preferably overly the lateral depressions of the pillion area whilst the central depression of the container receives the central rail of the pillion area. The respective surfaces on the container and pillion area on the scooter are designed to but each other and typically, the central rail is closely received within the central depression. This will typically form a close engagement between the container and pillion area to provide security and stability.

The container is normally attached to the pillion area of the scooter using elongate fasteners which preferably extend through the lateral depression of the base wall of the container. The raised central rail of the container preferably forms a resting surface upon which items placed into the container can rest although an interior base wall may be provided for this purpose. If provided, an interior base wall will also typically hide or obscure any fasteners used as well as hiding or obscuring the depressions and level the base of the container.

Preferably, the base of the container is mounted to be substantially horizontal.

It is preferred that the internal space of the container is defined by at least one and normally a number of interior walls and the external surface be defined by at least one and normally a number of exterior walls with the interior wall(s) spaced inwardly from the exterior wall(s).

The left and right side walls are normally configured as an interior side wall and an exterior sidewall or sidewall panel. A particularly preferred embodiment includes a sidewall with a sidewall panel therein or thereon.

The preferred interior side wall on each side is preferably substantially continuous. The preferred exterior sidewall will normally include one or more panels received within a sidewall surround.

Preferably, the sidewall panels are removable and/or replaceable. It is preferred that the sidewall panels are transparent and adapted to be releasably secured relative to the sidewall. In the preferred form, a depression is provided into which the sidewall panel is received and the sidewall panel is sized to fit closely within the depression. When fitted properly into the depression, the panel will normally be flush with the sidewall.

A template, stencil or patterned sheet is preferably provided with a message, pattern or indicia to be displayed and the sheet is then preferably received in the depression with the panel located thereover such that illumination from the container can at least partially pass through the sheet. Alternatively, the panel itself may be provided with the message, pattern or indicia.

Typically, an advertising message is provided upon the sheet or panel. The provision of the indicia, message or pattern in such a form allows easy removal and changing of the indicia, message or pattern without requiring removal of the container from the scooter. It is important to understand that the particular the type of sheet or panel is not important but the ability of the light to pass at least partially through the sheet or panel in order to display the indicia, message or pattern to a viewer, is important.

The forward wall will preferably be shaped in order to provide a backrest for the user when seated on the seat of the scooter. Preferably, the forward wall of the container is arcuate when viewed in plan. Typically, the forward wall will be smooth for comfort. Cushioning or other padding may be provided in order to enhance the comfort of the user.

Typically, the forward wall of the container will extend below the level of the seat of the scooter.

The rear wall of the container will normally include a door or similar closure provided in a rear wall surround. The rear wall is typically configured similarly to the side walls but with the panel provided in the door member itself.

Preferably, the door is sized to make up the majority of the rear wall with relatively small side, top and bottom surround portions.

Preferably, the door member is hinged at the lower end thereof and the upper portion of the door member opens by pivoting the door member downwardly and outwardly. Preferably, a hinge is provided on either side of the door member and is preferably located in the lateral depressions in the container.

The shape of the container is preferably integrated into the overall appearance of the scooter with the fairings or other bodywork of the scooter matched to the container or the container is matched to the fairings or other bodywork in order to provide a substantially uniform overall appearance. It is preferred that the appearance has clean lines, minimising drag and providing an aesthetically pleasing container to view.

Typically, a plurality of illumination sources are provided and are electrically connected via wires or similar electric connection devices to the scooter's electrical system.

Preferably, the container includes a heat source within the container, the heat source powered from the power plant of the scooter through the at least one alternator and preferably uses the generated electrical current.

The heat source may be or include an illumination source as well. It is known that some illumination sources whilst providing light, also generate significant amounts of heat which can be used to maintain the interior of the container at an elevated temperature.

Typically, the walls of the container are insulated order to reduce heat loss or heat gain to or from the container, particularly the interior portion of the container in order to maintain the interior of the container in either an elevated temperature condition or decreased temperature condition depending upon whether the preferred foodstuffs to be transported in the container are required to be kept hot or cold.

One or more illumination sources or elements are preferably positioned between the exterior walls of the container, and their respective, adjacent interior walls. The illumination elements are typically actuated manually by a switch which can be located on the box, or on the motorcycle, and are powered by the adapted power supply system of the motorcycle.

In an alternative embodiment, the illumination elements are actuated automatically when the motorcycle is turned on or started. The exterior walls are typically transparent, or translucent. Therefore, when the illumination elements are actuated, the light from the illumination elements shines through walls. Indicia are preferably displayed on the outside face of the exterior walls, and the light aids in the display of the indicia, typically at night time. The indicia may represent the manufacturer/retailer of the food being delivered, or represent any other business, whether related or not to the food being delivered.

The structure and interior walls of the container are typically mainly constructed from fibre glass, and the exterior walls are typically constructed from polycarbonate. Alternatively, the interior walls of the box and the exterior walls may be mainly constructed from any suitable polymeric materials with ABS for exterior walls and polypropylene for interior walls being particularly preferred materials. The interior walls are typically insulating, to reduce and/or prevent loss of heat generated by the food within the interior portion.

A heat source may be provided in the container, preferably in the form of halogen globes, but any heat source may be used. The heat source is preferably located on the floor of the box and is powered by the electrical supply system of the motorcycle. The heat source is typically actuated manually by a switch which can be located on the box, or on the motorcycle. In an alternative embodiment, the heat source is actuated automatically when the motorcycle is turned on or started. When actuated, the heat source aids in maintaining a warm to hot temperature within the interior portion, to keep the food therein warm.

In an alternative embodiment of the invention, the heat source is replaced with a cooling source, and the box is configured to transport cold items, such as ice cream and refrigerated meats.

The preferred illuminated elements may consist of neon or fluorescent tubes, LED panel screen or EF (electronic field) panel but any illumination source can be used.

The scooter and integrated container will also preferably utilise an appropriate electrical system to power the container and components, one form of which is described below.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

According to a particularly preferred embodiment of the present invention, a scooter vehicle 10 with integrated pillion transport container 11 is provided.

The scooter vehicle 10 illustrated in the Figures includes a pair of wheels, one rear driven wheel 12 and one forward steering wheel 13, a set of handlebars 14 for steering the steering wheel 13 to direct a scooter vehicle 10, a seat 15 for a user, a step through frame, a platform 16 for a user's feet, bodywork panels fitted to the frame and a power plant 17 associated with an alternator (not shown) in order to generate electrical current.

The integrated pillion transport container 11 includes a generally U-shaped lower portion to be attached to the scooter frame, the container having an enclosure defined by number of walls and having an interior portion adapted for receiving articles to be transported, at least one of the walls being a forward wall shaped to act as a back support for a user, and at least one illumination source located in the container for illuminating at least part of at least one external wall of the container, at least some of the walls to allow at least some of the illumination to pass therethrough.

The transportable container of the illustrated preferred embodiment is adapted for transporting food, the container in the form of a box, typically for attachment to a rear portion of a motorcycle or motor scooter.

Figure 2:
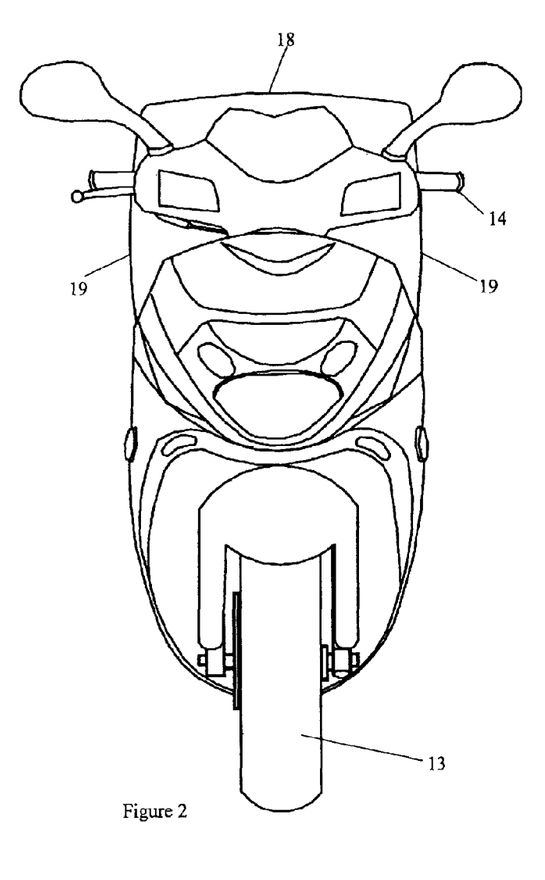
FIG. 2 is a view from the front of the scooter vehicle illustrated in FIG. 1.
Figure 3:
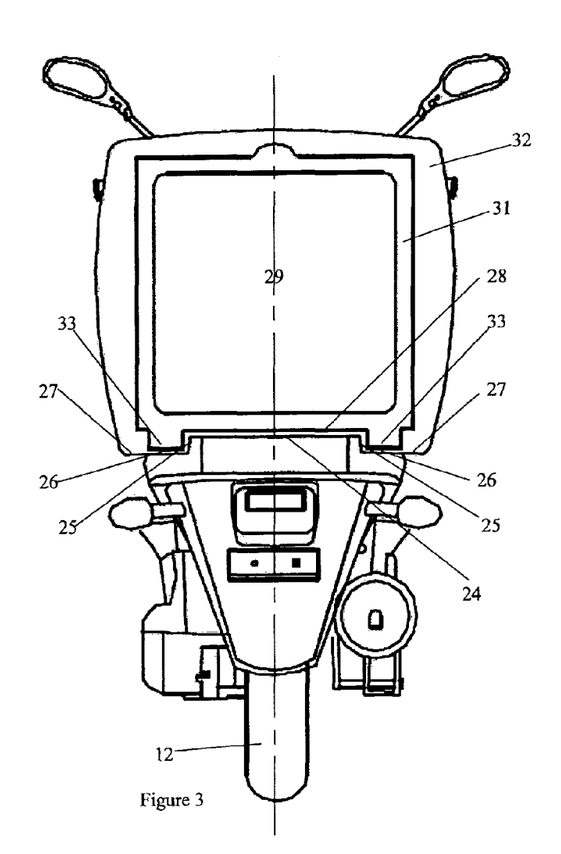
FIG. 3 is a view from the rear of the scooter vehicle illustrated in FIG. 1.

As illustrated in FIGS. 2 and 3 in particular, the container's 11 dimensions are such that the container 11 is no wider than the width of the handlebars 14 at the widest point of the container 11.

The illustrated container 11 is generally cubic with a top wall 18, a multipart bottom wall (obscured), left and right side walls 19, a forward wall 20 and rear wall 21.

The top wall 18 is substantially planar. According to the illustrated embodiment, the top wall 18 is a generally rectangular wall portion which fits together with an upper, rearwardly extending wall portion 22 formed as part of the forward wall 20 and a similarly upper and inwardly extending wall portion 23 formed as a part of each of the left and right side walls 19.

The bottom wall is perhaps best illustrated in FIG. 3 and is shaped to correspond with the rear of the scooter 10 in the pillion area provided behind the user's seat 15.

The pillion area of the scooter has a raised central rail 24 oriented coaxially with the longitudinal midline or axis of the scooter 10. A pair of downwardly depending shoulder portions 25 are provided from the raised central rail 24 and a pair of lateral depressions 26 are provided at a level lower than the raised central rail 24, one on either side of the central rail 24.

The bottom wall of the container is a multipart wall with wall portions at different angles to correspond to the shape provided in the pillion area of scooter. According to the preferred embodiment illustrated, a pair of outer, lateral depressions 27 is provided on the bottom wall which form raised portions on the lower side of the bottom wall, one on either side of a central, proud portion 28 which, on the lower side of the wall, forms a depression.

When the container 11 is mounted to the scooter 10, the outer container depressions 27 preferably overly the lateral depressions 26 of the pillion area whilst the central depression 28 of the container receives the central rail 24 of the pillion area. The respective surfaces on the container 11 and pillion area on the scooter are designed to abut each other and typically, the central rail 24 is closely received within the central depression 28. This will typically form a close engagement between the container 11 and pillion area to provide security and stability.

The container 11 is normally attached to the pillion area of the scooter using elongate fasteners which extend through the lateral depressions 27 of the bottom wall of the container 11.

The preferred embodiment of container has an internal space defined by interior walls and an external surface defined by exterior walls, with the interior walls spaced inwardly from the exterior walls.

The left and right side walls 19 of the preferred embodiment are configured as an interior side wall and an exterior sidewall or sidewall panel. The particularly preferred embodiment illustrated in FIG. 1 includes a sidewall 19 with a sidewall panel 29 therein. The preferred exterior sidewall includes a panel 29 received within a surround 30.

Figure 1:
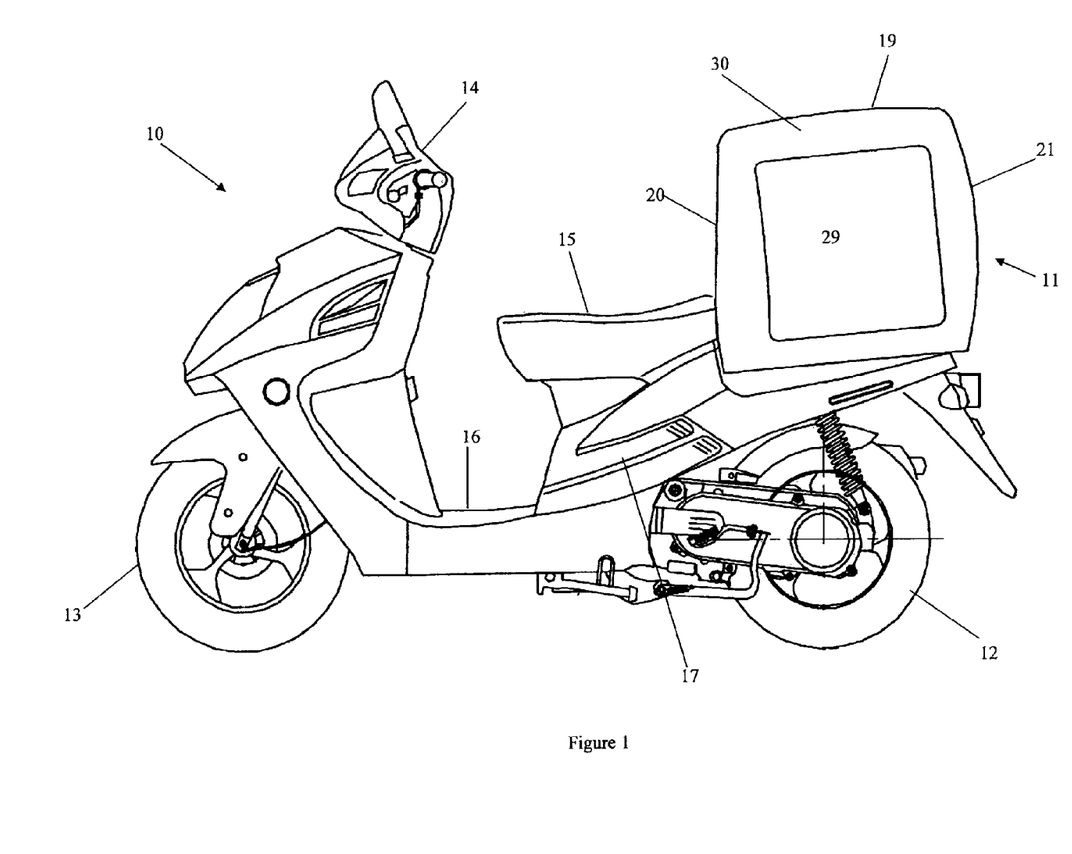
FIG. 1 is a side view of a preferred scooter vehicle with an integrated pillion transport container according to a preferred embodiment of the present invention.

The panel 29 is removable and/or replaceable. It is preferred that the sidewall panels 29 are transparent and adapted to be releasably secured relative to the sidewall 19. In the preferred form, a depression is provided into which the sidewall panel 29 is received and the sidewall panel 29 is sized to fit closely within the depression.

According to the preferred embodiment, a sheet provided with indicia to be displayed is received in the depression with the panel 29 located thereover such that illumination from the container 11 can at least partially pass through the sheet.

Figure 4:
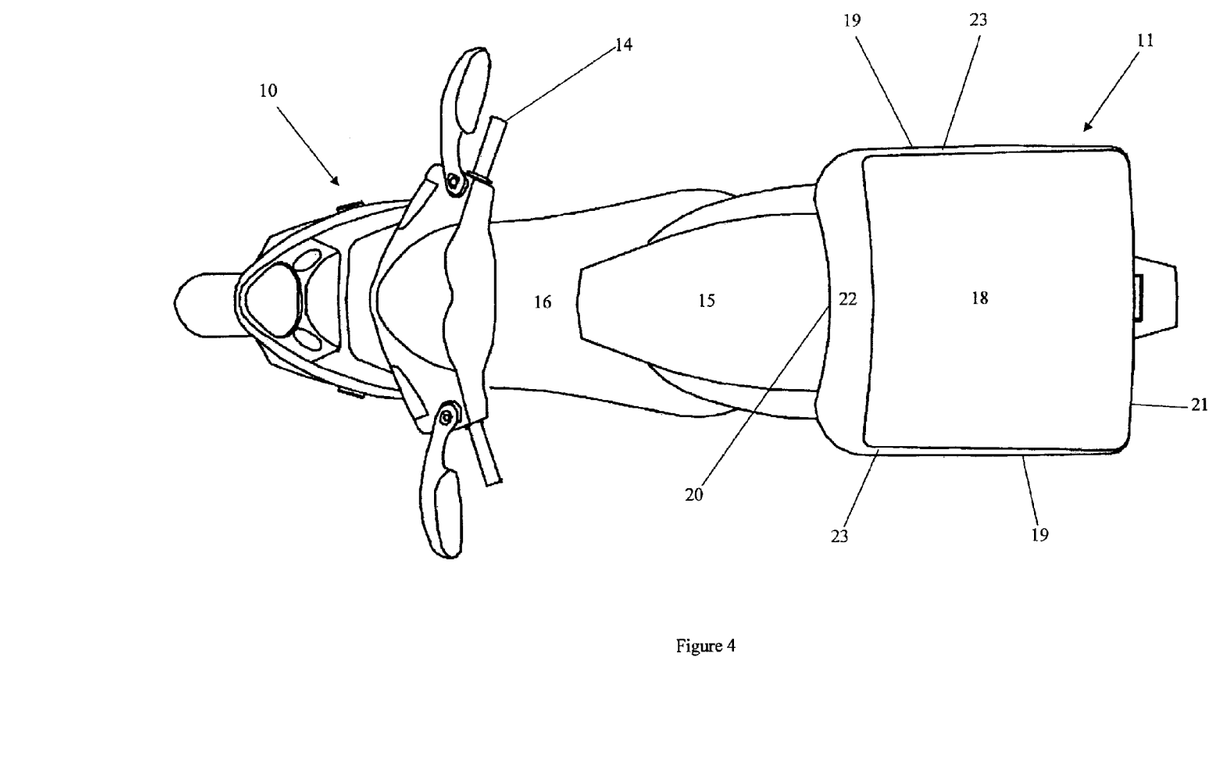
FIG. 4 is a view from the top of the scooter vehicle illustrated in FIG. 1.

The forward wall 20 is shaped in order to provide a backrest for the user when seated on the seat 15 of the scooter 10. Preferably, the forward wall 20 of the container is arcuate when viewed in plan as illustrated in FIG. 4 and extends below the level of the seat 15 of the scooter 10 as illustrated in FIG. 1.

The rear wall 21 of the container 11 illustrated in the Figures, particularly FIG. 3, includes a door 31 or similar closure provided in a rear wall surround 32. The rear wall 21 is typically configured similarly to the side walls but with the panel 29 provided in the door 31 itself.

As illustrated in FIG. 3, the door 31 is sized to make up the majority of the rear wall 21 with relatively small side, top and bottom surrounds 32.

The illustrated door 31 is hinged at the lower end thereof and the upper portion of the door 31 opens by pivoting the door 31 downwardly and outwardly. A hinge 33 is provided on either side of the door member and preferably is located in the lateral depressions in the container.

The shape of the container is preferably integrated into the overall appearance of the scooter with the fairings or other bodywork of the scooter matched to the container or the container is matched to the fairings or other bodywork in order to provide a substantially uniform overall appearance. It is preferred that the appearance has clean lines, minimising drag and providing an aesthetically pleasing view.

Typically, a plurality of illumination sources are provided and are electrically connected via wires or similar electric connection devices to the scooter's electrical system.

One or more illumination sources or elements are preferably positioned between the exterior walls of the container, and their respective, adjacent interior walls. The illumination elements are typically actuated manually by a switch which can be located on the container, or on the scooter, and are powered by the adapted power supply system of the scooter.

The structure and interior walls of the container are typically mainly constructed from fibre glass, and the exterior walls are typically constructed from polycarbonate. Alternatively, the interior walls of the box and the exterior walls may be mainly constructed from any suitable polymeric materials with ABS for exterior walls and polypropylene for interior walls being particularly preferred materials. The interior walls are typically insulating, to reduce and/or prevent loss of heat generated by the food within the interior portion.

In an alternative embodiment of the invention, the heat source is replaced with a cooling source, and the box is configured to transport cold items, such as ice cream and refrigerated meats.

The preferred illuminated elements may consist of neon or fluorescent tubes, LED panel screen or EF (electronic field) panel but any illumination source can be used.

According to the preferred embodiment, since the output voltage from a conventional alternator is volatile (it could reach more than 3 times between maximum and minimum), a conventional alternator together with a rectifier is not a perfect power supply. The varying voltage not only results in fluctuating brightness of the display unit (in the worst case it could shut down the display completely), but it can also significantly reduces the working life time of the display element.

The input electrical energy may be supplied by an alternator from the motor scooter, rechargeable battery (for scooters run mainly on electrical power rather than combustion) or using an alternative supply such as solar energy from the sun at daytime.

The preferred alternator maintains a higher voltage at increasing amperages than a conventional alternator and also provides a higher amperage at all speeds of engine operation (with a constant voltage output) than a conventional alternator.

The alternator of the present invention will normally produce multiphase alternating current and preferably, three phase current is produced. The number of coils present in the alternator will normally be increased and the coils will normally be divided into three groups.

In the most preferred configuration, 12 coils are provided on the stator core, the coils divided into three groups of four coils each.

The alternator of the preferred embodiment also preferably includes a larger diameter of wire used to make the coils in order to low copper wire resistance and minimize heat creation.

Further, more fixed magnets are preferable provided about the rotor of the alternator. Preferably, 4 pairs of magnet poles will be provided.

It is preferred that the system includes a switch mode power supply and AC/DC converter to convert low DC voltage to high AC voltage and stabilise the power supply to the container and particularly the illuminated display means.

The illuminated display means and/or heat or cold source will typically be capable of functioning even if the battery ceases to provide power.

The rectifier of the system may input power directly to the switch mode power supply. If so, then a transformer will normally be used to convert the DC power to AC power which the illuminated display means and/or heat or cold source can use. This will typically be approximately 2500V in the case of neon tubes.

Figure 5:
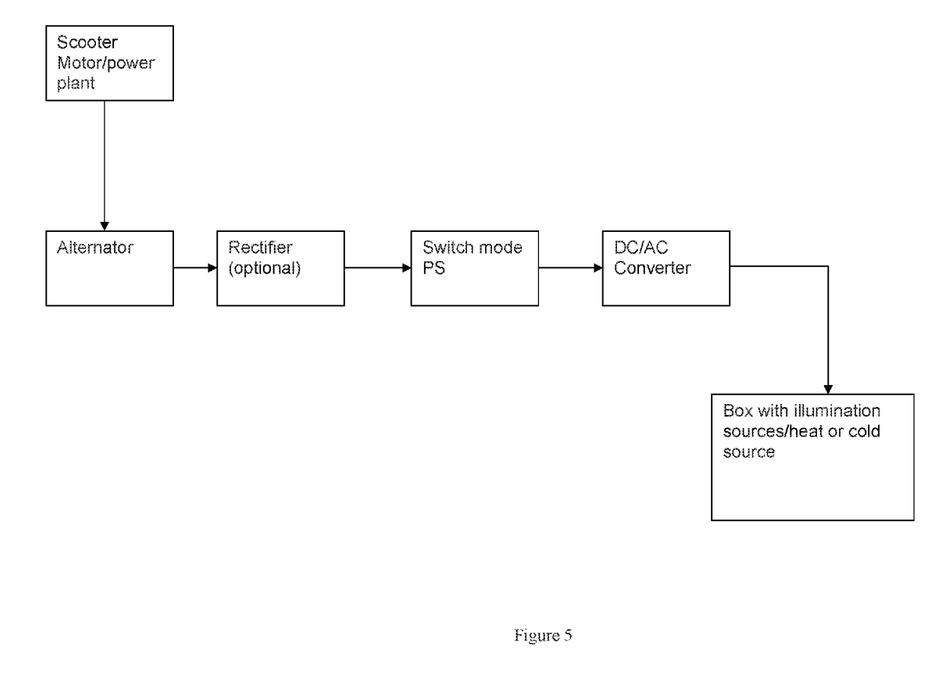
FIG. 5 is a schematic view of the electrical system of the scooter vehicle according to one preferred embodiment.

Alternatively, as illustrated in FIG. 5, the alternator may feed the switch mode power supply directly or via the rectifier.

It is preferred that the switch mode power supply will output a consistent DC output of about approximately 12V DC.

A switch mode power supply of the type 384X, normally 3843 is preferred. The preferred SMPS operates at high frequency isolating the input and output by using PWM (pulse width modulation) technology. It allows for a much wider range of changing input voltage (Vi=12V~30V input voltage range) to supply a constant output voltage. UC3843 is the preferred PWM circuit The switch mode power supply will normally have an associated adjustable shunt regulator, preferably of the type TL431.

Electronic switch-mode DC to DC converters (switch mode power supply) convert one DC voltage level to another, by storing the input energy temporarily and then releasing that energy to the output at a different voltage. The storage may be in either magnetic field storage components (inductors, transformers) or electric field storage components (capacitors). This conversion method is more power efficient (often 75% to 98%) than linear voltage regulation (which dissipates unwanted power as heat). This efficiency is beneficial to increasing the running time of battery operated devices.

As the power from the alternator will normally vary according to the engine output or RPM, the switch mode power supply will act to smooth the delivery of the power to the illuminated display means and/or heat or cold source.

The alternator and switch mode power supply will typically be capable of being retrofit to an existing motor scooter.

In this manner, the existing alternator of the scooter can simply be replaced with an alternator of the new type, and the existing power supply network can then continue to run the existing devices and still charge the battery. A portion of the power produced by the new alternator is also provided to the switch mode power supply which in turn provides this power to the illuminated display means and/or heat or cold source, which has also been retrofitted to the scooter in a stabilised manner. The consistent power supply to the illuminated display means and/or heat or cold source is therefore provided regardless of the number of other loads on the scooter electrical system and also less reliant on the speed of the engine of the scooter to maintain the power. Without the switch mode power supply, operation of the illuminated display means and/or heat or cold source would require that the scooter remain running at all times in order to power the illuminated display means and/or heat or cold source or at least run at much higher RPM.

The electrical elements of the illuminated container described here consist of neon tubes and a transformer, which converts low DC voltage 12V into high AC voltage around 2500V. To prevent flashing of neon tubes, we have to stabilize the input voltage of the transformer.

Analysis Facts a. Max electrical power
   i. The requested electrical power for a scooter with illuminated box is 35 watts more than a single scooter. Electrical power for a single motor scooter can be calculated by lamps (80 watts), speedometer (10 watts) and ignition (20 watts).
   ii. The amount of power required by a scooter with illuminated box therefore is (80 W+10 W+20 W)+35 W=145 watts.
   iii. The required current I=W/V=145/12≈12 A. Therefore, more than 35% of extra power is required by an electrical system including an illumination means.

b) Equivalent load R(equivalent)
   i. If all electrical resistant loads can be treated as an equivalent load, we can find out R(equivalent) by using the following formula:

$$R(\text{equivalent}) = V/I = 12V/12\ A \approx 1\Omega.$$

Interior equivalent road R(interior) is formed by wire resistance. The larger the outer diameter of the copper wire, the less resistance experienced.

Design and Calculation (a) Alternator Design

Most conventional scooter alternators generate single phase alternative current. Stator coils divided into different groups is a common design for 150 cc scooter, one group for lamps, the second group for ignition and the last group for the rest of the electronic devices including the battery charger. This design can keep the cost lower. The maximum output current from a rectifier is around 8 A to 10 A.

In order to generate the higher current required by the addition of the illuminated display means, three phase alternating current is required in the system of the present invention. The use of three phase power will increase the power, but the rectifier will also be required to convert the three phase AC power into DC for the battery and other loads of the scooter, including possibly as an input power source for the SMPS explained below.

For this purpose, 12 coils have been provided, divided into three groups of four coils have been used in the preferred alternator and the diameter of the wire used in the coils has also been increased as use of the conventional diameter wire would create more heat when the output power requested increases. The larger the outer diameter of the copper wire, the less resistance experienced. Therefore temperature increases caused by the resistance will be smaller if larger gauge wire is used.

Without wishing to be limited by theory, from the basic equation of electromagnetism:

$$E = \Delta\Phi N/\Delta T \qquad (4)$$

E→in voltage,
N→numbers of coil.
$\Delta\Phi$→the total flux of the conductor during time $\Delta T$
$\Delta\Phi = B\Delta A$,
B→Magnetic field density From formula 4, we can have:

$$E = BNlr\omega \quad (5)$$

l → coil dimension in depth,
r → radius between coil frame to its rotating centre point
ω → coil rotating velocity According to formulas (4) and (5), a designer can increase output power by changing the following elements:
  i. increasing magnet field density B
  ii. adding an extra number of coils
  iii. extending coil frame dimension of l (depth inside of magnet field)
  iv. speeding up stator coil (in this case, the rotating part is the fly wheel combined with permanent magnetic cylinder)
  v. enlarging size of copper wire Conditions (iii) and (iv) cannot be changed easily as they both involve redesign of the engine providing the output power. Changing condition (i), can increase current but it also contributes more heat as B (magnetic field density) is increased.

However changes to (ii), and (v) would be less complex in the present invention through a redesign of the alternator used.

The design of the present invention is able to supply sufficient current:

To obtain three phase output, divide twelve stator coils into three groups, each group having four coils.

To enlarge diameter of wire from 0.78~0.85 mm to 0.91 mm

To arrange four pairs of magnet poles around the fly wheel of alternator.

R(Interior) Calculation

According to copper wire gauge 19# data sheet, the resistance of wire R=0.0265 Ω/m (wire diameter=0.91 mm). The length of each group wire is around 10 meters.

$$R1 = R2 = R3 = 0.0265 \times 10 = 0.265 \Omega$$

Test Report

The alternator of the present invention is able to supply up to 170 watts of output power compared with normal alternator generates 120~125 watts. It gives sufficient power to run the newly added illuminated box as well as the remainder of the normal mechanisms of the motor scooter.

The alternator of a preferred form of the present invention includes 12 coils 5 mounted on a stator 3. A flywheel 1 is mounted concentrically outside the stator and is separated from the cover 6 by a silicon steel sheet 4. Also located inside the periphery of the cover 6 is a permanent magnet cylinder 2. The flywheel with the permanent magnet cylinder 2 mounted therewith rotates about the stator 3 and inside a magneto cover 6.

(b) Switch Mode Power Supply (SMPS) Using UC3843

To ensure that the illuminated display means will work well, the DC voltage available at input must be stabilized due to the variability of the power supply being dependent mainly on the speed of the engine of the motor scooter, using a high voltage converter. For customer satisfaction, the illuminated display means should keep working even under the worst case scenario when the battery is broken down.

The preferred SMPS operates at high frequency with isolating input and output by using PWM (pulse width modulation) technology. It allows for a much wider range for the changing input voltage (Vi=12V~30V input voltage range) to supply a constant output voltage. UC3843 is the preferred PWM circuit that works as long as input voltage is over 8.2V. It starts operation when voltage is over 9V.

UC3843 Under\Voltage Lockout (UVLO)

| Lockout section | Min | Typ | Max | Unit |
|---|---|---|---|---|
| Start threshold | 7.8 | 8.4 | 9.0 | V |
| Min Operation Voltage (after turn on) | 7.0 | 7.6 | 8.2 | V |

An internal undervoltage lockout (UVLO) circuit in the SMPS monitors the input voltage and keeps the illumination means in shutdown mode until the input supply rises above the UVLO threshold. If a battery is present when the input power is applied, the input supply must rise to above approximately 7.8V before the illumination means becomes operational. The UVLO circuit places the illumination means in shutdown mode if the input supply falls to approximately 7.0V.

In practice however, the electrical power supply system of the present invention will start the illumination means at a voltage as low as Vi=6V. Even in the worst scenario, the neon tubes will continuously work while battery is broken down, typically using the input power from the alternator or other power source. In fact the illumination means can work well as long as input voltage range between Vi=6~30V.

By combining with preferred alternator, this new power supply system is able to provide increased power, as well as a stable power supply to the illuminated display means whilst maintaining the other systems already present on the motor scooter.

Although the invention has been described with reference to particular examples, it will be appreciated by those skilled in the art that the invention may be embodied in many other forms. For example, the box 10 may be configured for delivery of any products, such as automotive parts and accessories, computer parts and accessories, stationary, etc. In these cases, the heat source would either be removed, or simply not actuated.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A scooter vehicle with integrated pillion transport container the scooter vehicle including at least two wheels, one driven wheel and one steering wheel, a set of handlebars for steering the steering wheel to direct a scooter vehicle, a seat for a user, a step through frame, a platform for a user's feet, bodywork panels fitted to the frame, and the integrated pillion transport container including a generally U-shaped lower portion to be attached to the scooter frame, the container having an enclosure defined by number of walls and having an interior portion adapted for receiving articles to be transported, and at least one illumination source located in the container for illuminating at least part of at least one external wall of the container, at least some of the walls to allow at least some of the illumination to pass therethrough, characterized in that the scooter vehicle includes a power plant associated with at least one alternator in order to generate electrical current, a switch mode power supply to smooth delivery of electrical current to the at least one illumination source powered at least in part from the electrical current generated by the at least one alternator through the switch mode power supply.

2. A scooter vehicle as claimed in claim 1 wherein a forward wall of the transport container is shaped to act as a back support for a user.

3. A scooter vehicle as claimed in claim 1 wherein at least one external wall of the container is adapted for displaying indicia.

4. A scooter vehicle as claimed in claim 1 wherein the container is no wider than a width of the set of handlebars on either side of the scooter vehicle.

5. A scooter vehicle as claimed in claim 1 wherein at least one sidewall panel is transparent and adapted to be releasably secured relative to the sidewall.

6. A scooter vehicle as claimed in claim 5 wherein a depression is provided into which the at least one sidewall panel is received and the at least one sidewall panel is sized to fit closely within the depression.

7. A scooter vehicle as claimed in claim 6 wherein one of a template, stencil and patterned sheet is provided with one of a message, pattern and indicia to be displayed and the sheet is then received in the depression with the at least one sidewall panel located thereover such that illumination from the container can at least partially pass through the sheet.

8. A scooter vehicle as claimed in claim 2 wherein the forward wall of the container extends below the level of the seat of the scooter.

9. A scooter vehicle as claimed in claim 1 wherein the rear wall of the container includes a door or similar closure provided in a rear wall surround hinged at a lower end thereof and an upper portion of the door member opens by pivoting the door member downwardly and outwardly.

10. A scooter vehicle as claimed in claim 1 wherein a plurality of illumination sources are provided and are electrically connected via wires to an electrical system of the scooter vehicle.

11. A scooter vehicle as claimed in claim 1 wherein the container includes a heat source within the container, the heat source powered from the power plant of the scooter through the at least one alternator.

12. A scooter vehicle as claimed in claim 11 wherein the heat source is actuated manually by a switch.

13. A scooter vehicle as claimed in claim 11 wherein the heat source is actuated automatically when the motorcycle is turned on or started.

14. A scooter vehicle as claimed in claim 1 wherein the at least one illumination source are actuated manually by a switch and are powered by the switch mode power supply system of the scooter vehicle.

15. A scooter vehicle as claimed in claim 1 wherein the at least one illumination source is actuated automatically when the scooter vehicle is turned on or started.

* * * * *